United States Patent
Perez-Rua et al.

(10) Patent No.: US 12,169,591 B2
(45) Date of Patent: Dec. 17, 2024

(54) METHOD AND APPARATUS FOR DYNAMIC HUMAN-COMPUTER INTERACTION

(71) Applicant: Samsung Electronics Co., Ltd., Suwon-si (KR)

(72) Inventors: Juan Perez-Rua, Staines (GB); Tao Xiang, Staines (GB); Maja Pantic, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 380 days.

(21) Appl. No.: 17/630,303

(22) PCT Filed: Dec. 4, 2020

(86) PCT No.: PCT/KR2020/017662
§ 371 (c)(1),
(2) Date: Jan. 26, 2022

(87) PCT Pub. No.: WO2021/125647
PCT Pub. Date: Jun. 24, 2021

(65) Prior Publication Data
US 2022/0269335 A1     Aug. 25, 2022

(30) Foreign Application Priority Data
Dec. 19, 2019 (GB) .................... 1918852

(51) Int. Cl.
*G06F 3/01*     (2006.01)
*G06V 10/70*     (2022.01)
(Continued)

(52) U.S. Cl.
CPC .............. *G06F 3/011* (2013.01); *G06V 10/70* (2022.01); *G06V 40/174* (2022.01); *G06V 40/20* (2022.01);
(Continued)

(58) Field of Classification Search
CPC ...... G06V 40/20; G06V 40/174; G06V 10/70; G06V 10/82; G06F 2203/011; G10L 25/63
See application file for complete search history.

(56) References Cited

U.S. PATENT DOCUMENTS 10,657,963 B2    5/2020    Cha et al.
10,835,823 B2    11/2020    Sumant et al.
(Continued)

FOREIGN PATENT DOCUMENTS

JP          2874858 B2    3/1999
JP          2018-068618 A    5/2018
(Continued)

OTHER PUBLICATIONS

Kim, et al. (Steward Robot: Emotional Agent for Subtle Human-Robot Interaction), pp. 263-268. (Year: 2006).*
(Continued)

*Primary Examiner* — Daniel G Mariam
(74) *Attorney, Agent, or Firm* — Jefferson IP Law, LLP (57) ABSTRACT

Broadly speaking, the present techniques relate to a method, apparatus and system for improving a user's engagement or emotion during a human-computer interaction, by dynamically adjusting the human-computer interaction in response to detected user emotion.

16 Claims, 2 Drawing Sheets

(51) Int. Cl.
  *G06V 40/16* (2022.01)
  *G06V 40/20* (2022.01)
  *G10L 25/63* (2013.01)
(52) U.S. Cl.
  CPC ........ *G10L 25/63* (2013.01); *G06F 2203/011* (2013.01)

(56) References Cited

U.S. PATENT DOCUMENTS

| | | | |
|---|---|---|---|
| 11,206,450 | B2 | 12/2021 | Kawk et al. |
| 2016/0364002 | A1 | 12/2016 | Gates et al. |
| 2018/0024626 | A1 | 1/2018 | Sanger et al. |
| 2018/0063064 | A1 | 3/2018 | Borse et al. |
| 2018/0322872 | A1 | 11/2018 | Cha et al. |
| 2019/0318268 | A1* | 10/2019 | Wang .................. H04L 67/1095 |
| 2019/0355209 | A1 | 11/2019 | Sorey et al. |
| 2019/0392195 | A1 | 12/2019 | Maeng |

FOREIGN PATENT DOCUMENTS

| | | |
|---|---|---|
| KR | 10-1051433 B1 | 7/2011 |
| KR | 10-2014-0108452 A | 9/2014 |
| KR | 10-2017-0086427 A | 7/2017 |
| KR | 10-1926403 B1 | 12/2018 |
| KR | 10-1949497 B1 | 2/2019 |
| KR | 10-2019-0056748 A | 5/2019 |
| KR | 10-2019-0091230 A | 8/2019 |
| KR | 10-2019-0105536 A | 9/2019 |

OTHER PUBLICATIONS

United Kingdom Search Report dated Jun. 1, 2020; United Kingdom Appln. No. 1918852.3.

* cited by examiner

METHOD AND APPARATUS FOR DYNAMIC HUMAN-COMPUTER INTERACTION

TECHNICAL FIELD

The present application generally relates to a method and apparatus for dynamic human-computer interaction, and in particular to methods for improving a user's engagement or emotion during a human-computer interaction in response to user emotion.

BACKGROUND ART

Users may interact with a computer or machine in a number of ways. For example, users may use their voice to instruct a virtual assistant to provide them with local weather information or to provide navigation instructions to help them to drive home. In another example, users may play a game on an electronic device that requires them to make choices at various stages of the game (similar to a "choose your own adventure" game or a "you decide on the adventure" game). However, if they become frustrated with any stage of, or the output of, the human-computer interaction, they are likely to quit using the virtual assistant or quit playing the game.

DISCLOSURE OF INVENTION

Technical Problem

The present applicant has recognised the need for improving human-computer interaction.

Solution to Problem

In a first approach of the present techniques, there is provided a method for dynamically adjusting a human-computer interaction (HCI) on a user device in response to user emotion, the method comprising: initiating a human-computer interaction (HCI) directed graph, the HCI directed graph comprising a plurality of nodes, wherein at least one of the plurality of nodes is an emotion-based option node that is linked to at least two output nodes and selection of an output node depends on user emotion; receiving, from at least one sensor when the HCI directed graph is at an emotion-based option node, data indicating user emotion; identifying, using a machine learning model, a user emotion from the received data; and selecting an output node linked to the emotion-based option node based on the identified user emotion.

As mentioned above, there is a desire to improve human-computer interaction (HCI) to prolong the user's interaction with the computer or to improve their experience. For example, if a user uses a virtual assistant to read out the steps of a recipe while they are cooking, if the user becomes frustrated because they are unsure how to perform one of the steps or because they do not have all of the ingredients, the user is likely to become annoyed with the cooking activity and may abandon the activity altogether. It is desirable to provide the user with help, tips or alternative recipes when the frustration is detected. Similarly, if a user is playing a game and at a particular stage in the game the user appears to be getting annoyed, to avoid the user quitting the game altogether, it may be desirable to, in response to detecting the annoyance, provide the user with a hint or clue to help them to proceed to the next stage in the game.

Thus, the present techniques enable dynamic adjustment of a human-computer interaction (HCI), where the HCI is defined by an HCI directed graph. The HCI directed graph comprises a plurality of nodes, where each node is connected to at least one other node in a predefined manner. Each node may be connected to at least one 'input' node and at least one 'output' node. There are two exceptions—the 'start' node of the HCI directed graph may be connected to one or more other output or action nodes (but no input nodes), and the 'end' node may be connected to one or more input nodes (but no output nodes). Some nodes may be connected to a single output node. In this case, there is no option to choose a particular output. This may be the case in some interactive games or movies ? there may be some scenes or stages in the game/movie which have to be followed or seen. Some nodes may be connected to multiple output nodes ? in this case, it is possible to provide the user with a particular output depending on their emotion/sentiment when they reach that node in the HCI graph. For example, there may be a default output that is selected when the user is determined to be happy or in a neutral state, and there may be another output that is selected when the user is determined to be frustrated.

The present techniques use a machine learning (ML) or artificial intelligence (AI) model/algorithm to predict or identify a user's emotion or sentiment during the human computer interaction. The ML model takes in, as input, sensed data that may be indicative of the user's current emotion, identifies the user's emotion from the sensed data, and provides, as output, instructions to select a particular output node in the HCI directed graph based on the identified emotion.

The method may be implemented on any suitable electronic user device, such as a smartphone, smart television, gaming equipment, robotic assistant, etc. The sensed data used to determine the user's emotion may be obtained using the sensor(s) within the device, or may be obtained from an external sensor. The ML model may be able to identify emotion using any type of sensor data (e.g. image data, heart rate data, audio data, etc.) Alternatively, a ML model may be selected and used based on the type of sensor data. That is, multiple ML models for identifying emotion may be stored, and the appropriate model may be selected based on the type of sensor data that is received. For example, if image data is received, a ML model that has been trained on image data may be selected and used to analyse the received image data.

The ML model used to identify emotion may be a convolutional neural network.

In some cases, the step of receiving data indicating user emotion may comprise receiving image data collected by an image sensor or camera. Here, the step of identifying a user emotion may comprise analysing the image data, using the machine learning model, to perform any one or both of: facial expression recognition and gesture recognition. Some facial expressions and hand/body gestures may be indicative of particular emotions.

In some cases, the step of receiving data indicating user emotion may comprise receiving audio data collected by a sound sensor or microphone. Here, the step of identifying a user emotion may comprise analysing the audio data using the machine learning model to perform any one or more of: tone recognition, sound event recognition, and speech recognition. Speech recognition may be used to identify words that are typically associated with a particular emotion. For example, particular swear words may be used when a person is angry. Voice tone recognition may be used to determine emotion ? for example, a person's tone voice tone may change when they become excited or when they are afraid. Sound event recognition may be used to recognise the sound(s) made by humans when undergoing different emotions, such as laughter when happy, sighing when bored or frustrated, screaming when scared or excited, etc.

The transition between nodes of the HCI directed graph may be defined by a further ML model. Thus, the method may comprise using a transition ML model to determine how the HCI directed graph moves from one node to another. In this case, the step of selecting 3 the output node may comprise: providing the identified user emotion to a transition machine learning model, the transition machine learning model defining transitions between nodes based on at least user emotion; and selecting an output node linked to the emotion-based option node using the transition machine learning model.

The transition ML model may be trained using reinforcement learning, such as by using target scores are rewards (e.g. level of engagement/attention, game playing time, enjoyment, stress, etc.).

The emotion-identifying machine learning model may be a global model that is provided for use by the user (e.g. may be downloaded and run on each user device). However, it may be desirable to either create a local version of the global model that is customised for the user, or to customise or calibrate the global model for the user. This may be useful because people may express emotions in different ways. For example, one person's resting facial expression (i.e. their expression when they are not expressing any particular emotion) 1 may be very different to another. Some people may have a resting facial expression that appears as if they are angry or annoyed. Similarly, hand or body gestures may have different meanings in different countries or cultures.

Thus, the method may further comprise calibrating the emotion-identifying machine learning model to recognise the emotions of the user of the user device. The calibration may be performed at any suitable time. For example, the calibration may be performed before, during, or after a human-computer interaction has occurred. The calibration may be performed in stages, e.g. audio calibration may be performed at a different time to visual calibration. The calibration may comprise asking a user to look into the camera of their user device and present 2 different facial expressions, e.g. "a happy face", "an angry face", "a bored face", etc.

Additionally or alternatively, the calibrating may comprise: receiving, from the at least one sensor, data indicating user emotion; identifying, using the machine learning model, a user emotion from the received data; outputting, to the user of the device, the received data, the identified user emotion and a request for the user to verify the accuracy of the identified user emotion; and updating the machine learning model based on a verification response received from the user.

When the verification response states that the identified user emotion is incorrect, the method may comprise requesting the user of the device to input a correct user emotion, and updating the machine learning model based on the user input.

The method may further comprise updating the HCI directed graph or the transition ML model to take into a user's previous interactions with that particular graph. For example, if the user has played a particular interactive game multiple times (which is defined by an HCI directed graph), the user may have quit the game at the same point or at different points because they became frustrated with the game or found it too hard. If the user quits the game at the same point, it may be desirable to avoid the user ending up at that point so that they are more likely to continue playing the game. Thus, the method may comprise: identifying, when an HCI directed graph has been initiated more than once, a node at which the user previously terminated the HCI directed graph; retrieving information regarding the user emotion when the user previously terminated the HCI directed graph; and adjusting the HCI 1 directed graph to avoid the user arriving at the identified node.

The selected output node may initiate a procedure outside of the HCI directed graph. When the procedure outside of the HCI directed graph is initiated, the HCI directed graph may terminate. Alternatively, when the procedure outside of the HCI directed graph ends, the method may return to the HCI directed graph.

In a related approach of the present techniques, there is provided a non-transitory data carrier carrying processor control code to implement the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor 3 system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub components which may take the form of instructions or sequences of instructions at any of the levels of abstraction, from the direct machine instructions of a native instruction set to highlevel compiled or interpreted language constructs.

Embodiments of the present techniques also provide a non-transitory data carrier carrying code which, when implemented on a processor, causes the processor to carry out any of the methods described herein.

The techniques further provide processor control code to implement the abovedescribed methods, for example on a general purpose computer system or on a digital signal 1 processor (DSP). The techniques also provide a carrier carrying processor control code to, when running, implement any of the above methods, in particular on a non-transitory data carrier. The code may be provided on a carrier such as a disk, a microprocessor, CD- or DVDROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog (RTM) or VHDL (Very high speed integrated circuit 2 Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be 3 embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The above-mentioned features described with respect to the first approach apply equally to the second and third approaches.

In a second approach of the present techniques, there is provided an apparatus for dynamically adjusting a human-computer interaction (HCI) on the apparatus, the apparatus comprising: a user interface for receiving a user request to initiate a HCI directed graph; at 1 least one sensor; and at least one processor coupled to memory and arranged to: initiate a human-computer interaction (HCI) directed graph, the HCI directed graph comprising a plurality of nodes, wherein at least one of the plurality of nodes is an emotion-based option node that is linked to at least two output nodes and selection of an output node depends on user emotion; receive, from at least one sensor when the HCI directed graph is at an emotion based option node, data indicating user emotion; identify, using a machine learning model, a user emotion from the received data; and select an output node linked to the emotion-based option node based on the identified user emotion.

The at least one sensor may comprise an image sensor or camera, and the processor 2 may identify a user emotion by: analysing image data collected by the image sensor or camera, using the machine learning model, to perform any one or both of: facial expression recognition and gesture recognition.

The at least one sensor may comprise a sound sensor or microphone, and the processor may identify a user emotion by: analysing audio data collected by the sound sensor or microphone, using the machine learning model, to perform any one or more of: tone recognition, sound event recognition, and speech recognition.

The apparatus may be any one of: a smartphone, tablet, laptop, computing device, smart television, gaming device, and robotic device. It will be understood that this is a nonlimiting and non-exhaustive list of example apparatuses.

In a third approach of the present techniques, there is provided a system for dynamically adjusting a human-computer interaction (HCI) on an apparatus, the system comprising: at least one sensor for sensing user emotion; and an apparatus comprising: a user interface for receiving a user request to initiate a HCI directed graph; a communication module for communicating with at least one sensor; and at least one processor coupled to memory and the communication module and arranged to: initiating a human-computer interaction (HCI) directed graph, the HCI directed graph comprising a plurality of nodes, wherein at least one of the plurality of nodes is an emotion-based option node that is linked to at least two output nodes and selection of an output node depends on user emotion; receiving, from at least one sensor when the HCI directed graph is at an emotion-based option node, 1 data indicating user emotion; identifying, using a machine learning model, a user emotion from the received data; and selecting an output node linked to the emotion-based option node based on the identified user emotion.

The at least one sensor may be a heart-rate sensor provided in a wearable device. The apparatus may be a smartphone or computing device which is connectable to the wearable device.

Advantageous Effects of Invention

Broadly speaking, the present techniques relate to a method, apparatus and system for improving a user's engagement or emotion during a human-computer interaction, by dynamically adjusting the human-computer interaction in response to detected user emotion.

BRIEF DESCRIPTION OF DRAWINGS

Implementations of the present techniques will now be described, by way of example only, with reference to the accompanying drawings, in which.

BEST MODE FOR CARRYING OUT THE INVENTION

Mode for the Invention

Figure 1A:
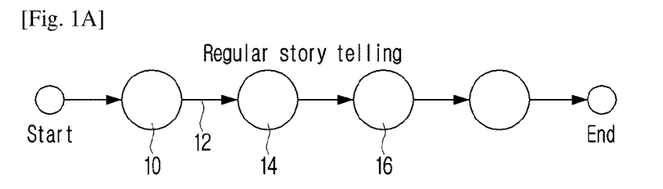
FIG. 1A is a schematic diagram of a fixed graph representing a human-computer interaction that cannot be adjusted.

FIG. 1A is a schematic diagram of a fixed graph representing a human-computer interaction that cannot be adjusted. The graph comprises a plurality of nodes, where each 1 node is linked to at least another node. Each node may be linked to an input node, an output node, or both. For example, node 14 is linked to input node 10 and output node 16. Node 10 is itself linked to an input node (the start node) and output node 14. The graph defines transitions 12 between each node. The graph is linear and there is only one way the story or interaction may proceed from the start node to the end node. Even if a user makes inputs, the inputs do not affect the graph or the transitions from node to node.

This type of graph describes all standard (non-interactive) television programmes and movies, and many video games.

Figure 1B:
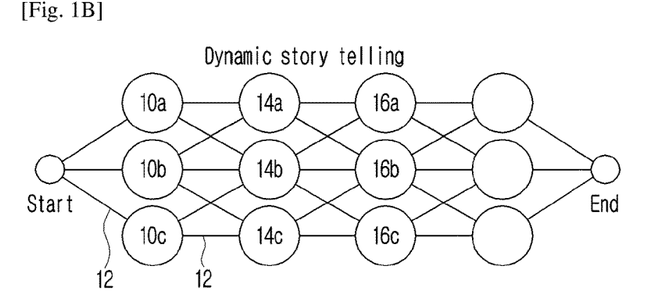
FIG. 1B is a schematic diagram of a directed graph representing a human-computer interaction that uses user input to determine flow through the graph.

FIG. 1B is a schematic diagram of a directed graph representing a human-computer 2 interaction that uses user input to determine flow through the graph. The graph comprises a plurality of nodes, where each node is linked to at least another node. Each node may be linked to an input node, an output node, or both. For example, node 0a is linked to one input node (the start node) and two output nodes 14a and 14b. That is, there is only one way to get to node 10a from the start node, but there are two output options or actions that can be taken from node 10a. Node 14b is linked to three input nodes 10a, 10b and 10c, and three output nodes 16a, 16b and 16c. That is, there are three ways to reach node 14b, and there are three output options/actions that can be taken from node 14b. The graph defines transitions 12 between each node. The transitions 12 may depend on user input. Thus, user input or decisions may be used to influence or determine the story or interaction. This type of graph describes many interactive television programmes and movies, and some games (such as Fable and The Witcher).

Figure 2:
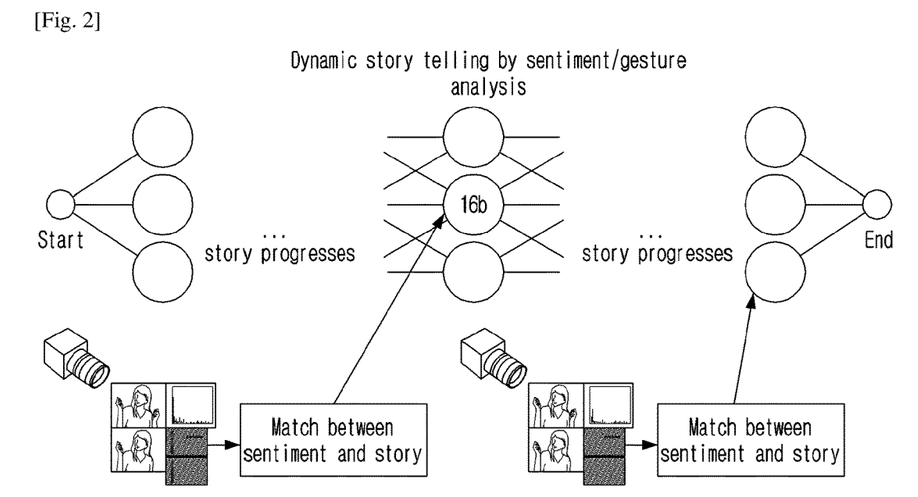
FIG. 2 is a schematic diagram of a dynamically adjustable directed graph that 3 responds to user emotion.

FIG. 2 is a schematic diagram of a dynamically adjustable directed graph representing a human-computer interaction, where flow through the graph may be in response to user emotion. As in FIG. 1B, the graph comprises a plurality of nodes, where each node is linked to at least another node. However, at particular nodes, such as node 16b, a user's emotion may be identified and used to determine how the interaction proceeds, i.e. which transition and output node is to be selected. These nodes may be considered "emotion-based option nodes", i.e. nodes where user emotion is used to determine the output or action to be taken, or how to move from that node to another node within the graph.

Figure 3:
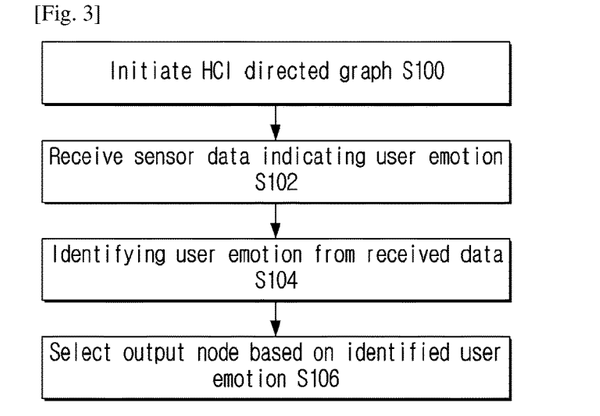
FIG. 3 is a flowchart of example steps to dynamically adjust a human-computer interaction based on user emotion.

FIG. 3 is a flowchart of example steps to dynamically adjust a human-computer interaction based on user emotion. The method may begin by initiating a human-computer 1 interaction (HCI) directed graph. The HCI directed graph may be initiated when a user begins playing an interactive computer game, watching an interactive television programme or other interactive media item, or launches/uses an interactive app or service (such as a virtual assistant). The HCI directed graph comprises a plurality of nodes, wherein at least one of the plurality of nodes is an emotion-based option node that is linked to at least two output nodes and selection of an output node depends on user emotion (step S100).

The method may comprise receiving, from at least one sensor when the HCI directed graph is at an emotion-based option node, data indicating user emotion (step S102). 2

Step S102 may comprise receiving image data collected by an image sensor or camera, audio data collected by a sound sensor or microphone, biometric data collected by a sensor, perspiration data collected by a perspiration monitoring sensor, and/or heart rate data collected by a heart rate monitor.

The method may comprise identifying, using an emotion-identifying machine learning model, a user emotion from the received sensor data (step S104). For example, the step of identifying a user emotion may comprise analysing image data, using the machine learning model, to perform any one or both of: facial expression recognition and gesture recognition. Some facial expressions and gestures may be indicative of particular emotions. Additionally 3 or alternatively, the step of identifying a user emotion may comprise analysing the audio data using the machine learning model to perform any one or more of: tone recognition, sound event recognition, and speech recognition. Speech recognition may be used to identify words that are typically associated with a particular emotion. For example, particular swear words may be used when a person is angry. Voice tone recognition may be used to determine emotion ? for example, a person's tone voice tone may change when they become excited or when they are afraid. Sound event recognition may be used to recognise the sound(s) made by humans when undergoing different emotions, such as laughter when happy, sighing when bored or frustrated, screaming when scared or excited, etc. Additionally or alternatively, the step of identifying a user emotion may comprise analysing the heart rate data and/or perspiration data using the machine learning model to determine if the user is calm, excited, tired, etc.

Once the user emotion has been identified, the method may comprise selecting an output node linked to the emotion-based option node based on the identified user emotion 1 (step S106). That is, the method selects one of the at least two output nodes linked to the emotion-based option node based on the user emotion.

The transition between nodes of the HCI directed graph may be defined by a further ML model. Thus, the method may comprise using a transition ML model to determine how the HCI directed graph moves from one node to another. In this case, the step S106 of selecting the output node may comprise: providing the identified user emotion to a transition machine learning model, the transition machine learning model defining transitions between nodes based on at least user emotion; and selecting an output node linked to the emotionbased option node using the transition machine learning model. 2

The emotion-identifying machine learning model may be a global model that is provided for use by the user (e.g. may be downloaded and run on each user device). However, it may be desirable to either create a local version of the global model that is customised for the user, or to customise or calibrate the global model for the user. This may be useful because people may express emotions in different ways. For example, one person's resting facial expression (i.e. their expression when they are not expressing any particular emotion) may be very different to another. Some people may have a resting facial expression that appears as if they are angry or annoyed. Similarly, hand or body gestures may have different meanings in different countries or cultures.

Thus, the method may further comprise calibrating the emotion-identifying machine learning model to recognise the emotions of the user of the user device. The calibration may be performed at any suitable time. For example, the calibration may be performed before, during, or after a human-computer interaction has occurred. The calibration may be performed in stages, e.g. audio calibration may be performed at a different time to visual calibration. The calibration may comprise asking a user to look into the camera of their user device and present different facial expressions, e.g. "a happy face", "an angry face", "a bored face", etc.

Additionally or alternatively, the calibrating may comprise: receiving, from the at least one sensor, data indicating user emotion; identifying, using the machine learning model, a user emotion from the received data; outputting, to the user of the device, the received data, the identified user emotion and a request for the user to verify the accuracy of the identified user emotion; and updating the machine learning model based on a verification response received from the user. 1

When the verification response states that the identified user emotion is incorrect, the method may comprise requesting the user of the device to input a correct user emotion, and updating the machine learning model based on the user input. The method may further comprise updating the HCI directed graph or the transition ML model to take into a user's previous interactions with that particular graph. For example, if the user has played a particular interactive game multiple times (which is defined by an HCI directed graph), the user may have quit the game at the same point or at different points because they became frustrated with the game or found it too hard. If the user quits the game 2 at the same point, it may be desirable to avoid the user ending up at that point so that they are more likely to continue playing the game. Thus, the method may comprise: identifying, when an HCI directed graph has been initiated more than once, a node at which the user previously terminated the HCI directed graph; retrieving information regarding the user emotion when the user previously terminated the HCI directed graph; and adjusting the HCI directed graph to avoid the user arriving at the identified node.

The selected output node may initiate a procedure outside of the HCI directed graph. When the procedure outside of the HCI directed graph is initiated, the HCI directed graph may terminate. Alternatively, when the procedure outside of the HCI directed graph ends, the method may return to the HCI directed graph. This is explained by reference to the following examples.

In a first example, a person may be cooking a meal. The person may have a robotic assistant device in their kitchen. The person may be following a recipe and method that the robotic assistant device reads/speaks out loud in a step-by-step manner. In this case, the method/recipe may be an HCI directed graph, where each step of the method is a node in the graph. The robotic assistant may proceed to the next step in a method when the person says, "what's next?" or a similar phrase, or by recognising the user's cooking actions (e.g. that they've finished chopping an onion). The robotic assistant device may comprise at least an image sensor or camera, but may also comprise an audio sensor or microphone. While at a particular step (node) of the recipe, the person may become visibly frustrated (e.g. they may have a frustrated facial expression and/or their gestures or body language may indicate frustration). The robotic assistant device may detect this frustration by using the emotion 1 detecting ML model to analyse images collected by the image sensor. In response, the frustration may be used to determine which output node to proceed to in the HCI directed graph in order to make the person feel better and/or to help them finish cooking. For example, if the person is unable to follow the instructions to "finely dice one onion", the present techniques may select the output node in the HCI directed graph which corresponds to displaying a video showing how to dice an onion. In another example, if the user discovers that they are missing some ingredients, the output may be to ask the user if they want to place an online food delivery order, or to ask the user if they want to perform online grocery shopping, or may display similar recipes or use similar ingredients.

In another example, a person may be playing a computer game. The person may become stuck at a particular point in the game because they have been asked to solve a difficult riddle. A camera or microphone in the television, screen or gaming equipment being used to play the computer game may detect that the user is becoming frustrated. It may appear that the user is becoming angry and is close to quitting the game. In response, the detected anger may be used to determine which output node to proceed to in the HCI directed graph in order to prolong the user's gaming session. For example, the present techniques may select the output node in the HCI directed graph which corresponds to displaying a clue to the riddle, or which provides an alternative route for the game to progress. The user may accept the clue/alternative route, and consequently enjoys and plays the game for longer.

In another example, a person may be watching an interactive movie. A scene in the movie which is gruesome or scary may be played, and a camera or microphone in the television or device being used to watch the movie may detect that the user is unhappy or scared by the scene. Further information may be used to determine whether the user enjoys being scared, because some users may enjoy honor movies or may not be upset by scary or violent scenes in movies. The further information may come from one or more sensors or may be obtained by learning the user's movie preferences (e.g. the user regularly watches horror movies and therefore they probably enjoy being scared). In response, the "unhappy" or "scared" emotion may be used to determine which output node to proceed to in the HCI directed graph in order to enable the user to watch the movie for longer. For example, a node in the HCI directed graph may be selected which enables the movie to evolve into a more light-hearted movie when it is determined that the user does not enjoy being scared. The person then enjoys the film and the interactive experience, which may be indicated by the person watching the movie to the end.

Figure 4:
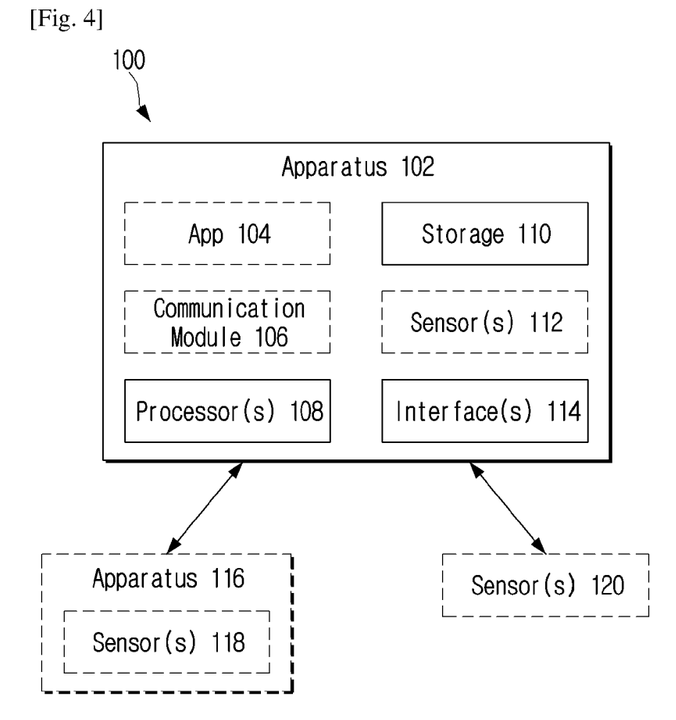
FIG. 4 is a block diagram of an apparatus and system for dynamically adjusting a human-computer interaction based on user emotion.

FIG. 4 is a block diagram of an apparatus 102 and system 100 for dynamically adjusting a human-computer interaction based on user emotion.

The apparatus 102 for dynamically adjusting a human-computer interaction (HCI) on the apparatus may be any one of: a smartphone, tablet, laptop, computing device, smart television, gaming device, and robotic device. It will be understood that this is a non-limiting and non-exhaustive list of example apparatuses.

Apparatus 102 comprises: a user interface 114 for receiving a user request to initiate 2 a HCI directed graph; and at least one processor or processing circuitry 108 coupled to memory and arranged to: initiate a human-computer interaction (HCI) directed graph, the HCI directed graph comprising a plurality of nodes, wherein at least one of the plurality of nodes is an emotion-based option node that is linked to at least two output nodes and selection of an output node depends on user emotion; receive, from at least one sensor when the HCI directed graph is at an emotion-based option node, data indicating user emotion; identify, using a machine learning model, a user emotion from the received data; and select an output node linked to the emotion-based option node based on the identified user emotion.

The processor 108 may comprise processing logic to process the sensor data and 3 generate output data/messages in response to the processing. The processor may comprise one or more of: a microprocessor, a microcontroller, and an integrated circuit.

The apparatus 102 comprises one or more interfaces 114, such as the user interface, that enable the device to receive inputs and/or generate outputs (e.g. audio and/or visual inputs and outputs, or control commands, etc.) For example, the appartus 102 may comprise a display screen, a camera and/or a microphone to enable a user to interact with the apparatus 102.

The apparatus 102 may comprise storage 110. Storage 110 may comprise a volatile memory, such as random access memory (RAM), for use as temporary memory, and/or nonvolatile memory such as Flash, read only memory (ROM), or electrically erasable programmable ROM (EEPROM), for storing data, programs, or instructions, for example. Storage 110 may store the emotion-identifying ML model and/or the transition ML model.

In some cases, the apparatus 102 may comprise an app (i.e. a software application) 1 104 which the user may use to initiate a process that is defined by an HCI directed graph.

In some cases, the apparatus 102 may comprise at least one sensor 112. The at least one sensor 112 may comprise an image sensor or camera, and the processor may identify a user emotion by: analysing image data collected by the image sensor or camera, using the machine learning model, to perform any one or both of: facial expression recognition and gesture recognition.

Additionally or alternatively, the at least one sensor 112 may comprise a sound sensor or microphone, and the processor may identify a user emotion by: analysing audio data 2 collected by the sound sensor or microphone, using the machine learning model, to perform any one or more of: tone recognition, sound event recognition, and speech recognition.

It will be understood that the apparatus 102 may comprise any type of and any number of sensors 112.

In some cases, the apparatus 102 which is implementing the HCI directed graph, and with which the user is interacting, may not comprise a sensor. In this case, sensor data may be obtained from at least one sensor located external to the apparatus 102. For example, system 100 may comprise another apparatus 116 which comprises at least one sensor 118. 3 The apparatus 116 may be, for example, a wearable device and the sensor 118 may be a heart rate monitor. In another example, apparatus 102 may be games console and apparatus 116 may be a smart television having an image sensor 118. The apparatus 116 is communicatively coupled to apparatus 102 (directly or indirectly, e.g. via a home hub or gateway device), and sensed data may be transmitted by apparatus 116 and received by communication module 106 of apparatus 102.

Thus, apparatus 102 may comprise a communication module 106 suitable for sending and receiving data. The communication module may communicate with apparatus 116 or other components of the system 100 using any one or more of: wireless communication (e.g. WiFi), hypertext transfer protocol (HTTP), message queuing telemetry transport (MQTT), a wireless mobile telecommunication protocol, short range communication such as radio frequency communication (RFID) or near field communication (NFC), or by using the communication protocols specified by ZigBee, Thread, Bluetooth, Bluetooth LE, IPv6 over Low Power Wireless Standard (6LoWPAN), Constrained Application Protocol (CoAP), wired 1 communication. The communication module 106 may use a wireless mobile (cellular) telecommunication protocol to communicate with components of the system, e.g. 3G, 4G, G, 6G etc. The communication module 106 may communicate with other devices in the system 100 using wired communication techniques, such as via metal cables or fibre optic cables. The apparatus 102 may use more than one communication technique to communicate with other apparatus 116 in the system 100. It will be understood that this is a non-exhaustive list of communication techniques that the communication module 106 may use. It will also be understood that intermediary devices (such as a gateway) may be located between the apparatus 102 and other components in the system 100, to facilitate communication between the machines/components.

In some cases, the sensor may be a standalone sensor 120 in the system 100. For example, the sensor may be a camera that is part of an intruder detection system ? the camera may be used to detect user emotion when the intruder detection system is not in use (because the user is at home). The apparatus 102 may be able to receive data sensed by sensor 120 in the same way as described above with respect to apparatus 116.

Thus, the present techniques provide a system 100 for dynamically adjusting a humancomputer interaction (HCI) on an apparatus 102, the system 100 comprising: at least one sensor 118, 120 for sensing user emotion; and an apparatus 102 comprising: a user interface 3 114 for receiving a user request to initiate a HCI directed graph; a communication module 106 for communicating with at least one sensor 118, 120; and at least one processor 108 coupled to memory and the communication module and arranged to: initiating a human-computer interaction (HCI) directed graph, the HCI directed graph comprising a plurality of nodes, wherein at least one of the plurality of nodes is an emotion-based option node that is linked to at least two output nodes and selection of an output node depends on user emotion; receiving, from at least one sensor 118, 120 when the HCI directed graph is at an emotion-based option node, data indicating user emotion; identifying, using a machine learning model, a user emotion from the received data; and selecting an output node linked to the emotion-based option node based on the identified user emotion.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the 1 embodiments may take a wide range of modifications without departing from any inventive concept as defined in the appended claims.

The invention claimed is:

1. A method for dynamically adjusting a human-computer interaction (HCI) on a user device in response to user emotion, the method comprising:
    initiating an HCI directed graph when a user launches an interactive activity on the user device, the HCI directed graph comprising a plurality of nodes and defining transition between the plurality of nodes to perform the interactive activity, wherein at least one of the plurality of nodes is an emotion-based option node that is linked to at least two output nodes;
    receiving, from at least one sensor when the HCI directed graph is at the emotion-based option node, data indicating user emotion;
    identifying, using a machine learning model, a user emotion from the received data; and
    selecting an output node among the at least two output nodes based on the identified user emotion,
    wherein the at least two output nodes are nodes located in a next step of the emotion-based option node in a flow of the interactive activity, thereby continuing the flow through the HCI directed graph based on the user emotion.

2. The method of claim 1, wherein the selecting of the output node comprises:

providing the identified user emotion to a transition machine learning model, the transition machine learning model defining transitions between nodes based on at least user emotion, and selecting an output node linked to the emotion-based option node using the transition machine learning model.

3. The method of claim 2, wherein the receiving of the data indicating user emotion comprises receiving image data collected by an image sensor or camera.

4. The method of claim 1, wherein the receiving of the data indicating user emotion comprises receiving image data collected by an image sensor or camera.

5. The method of claim 4, wherein the identifying of the user emotion comprises analyzing the image data, using the machine learning model, to perform either of:

a facial expression recognition or a gesture recognition.

6. The method of claim 1, wherein the receiving of the data indicating user emotion comprises receiving audio data collected by a sound sensor or microphone.

7. The method of claim 6, wherein the identifying of the user emotion comprises analyzing the audio data using the machine learning model to perform any one or more of:

tone recognition, sound event recognition, or speech recognition.

8. The method of claim 1, wherein the machine learning model is a global model, and the method further comprises:

calibrating the machine learning model to recognize the emotions of the user of the user device.

9. The method of claim 8, wherein the calibrating of the machine learning model comprises:

receiving, from the at least one sensor, data indicating user emotion, identifying, using the machine learning model, a user emotion from the received data, outputting, to the user of the device, the received data, the identified user emotion and a request for the user to verify an accuracy of the identified user emotion, and updating the machine learning model based on a verification response received from the user.

10. The method of claim 9, wherein when the verification response states that the identified user emotion is incorrect, further comprises:

requesting the user of the device to input a correct user emotion, and updating the machine learning model based on the user input.

11. The method of claim 1, the method further comprising:

identifying, when an HCI directed graph has been initiated more than once, a node at which the user previously terminated the HCI directed graph;

retrieving information regarding the user emotion when the user previously terminated the HCI directed graph; and adjusting the HCI directed graph to avoid the user arriving at the identified node.

12. The method of claim 1, wherein the selected output node initiates a procedure outside of the HCI directed graph.

13. The method of claim 12, wherein when the procedure outside of the HCI directed graph is initiated, the HCI directed graph terminates.

14. The method of claim 12 wherein when the procedure outside of the HCI directed graph ends, the method returns to the HCI directed graph.

15. A non-transitory computer readable storage medium configured to store one or more computer programs including instructions which, when executed by a processor, causes the processor to carry out the method of claim 1.

16. An apparatus for dynamically adjusting a human-computer interaction (HCI) on the apparatus, the apparatus comprising:

a user interface for receiving a user request to launch an interactive activity on the apparatus;

at least one sensor; and at least one processor coupled to memory and arranged to:

initiate an HCI directed graph when a user launches the interactive activity on the apparatus, the HCI directed graph comprising a plurality of nodes defining transition between the plurality of nodes to perform the interactive activity, wherein at least one of the plurality of nodes is an emotion-based option node that is linked to at least two output nodes, receive, from at least one sensor when the HCI directed graph is at an emotion based option node, data indicating user emotion, identify, using a machine learning model, a user emotion from the received data, and select an output node among the at least two output nodes based on the identified user emotion, wherein the at least two output nodes are nodes located in a next step of the emotion-based option node in a flow of the interactive activity, thereby continuing the flow through the HCI directed graph based on the user emotion.

* * * * *